United States Patent [19]

Robertson et al.

[11] Patent Number: 4,479,765
[45] Date of Patent: Oct. 30, 1984

[54] EXHAUST GAS OPERATED VACUUM PUMP ASSEMBLY

[75] Inventors: Gerald F. Robertson, Mt. Clemens; Donald J. Pozniak, Utica, both of Mich.; Michael J. McClain, Dayton, Ohio

[73] Assignee: General Motors Corporation, Detroit, Mich.

[21] Appl. No.: 427,650

[22] Filed: Sep. 29, 1982

[51] Int. Cl.³ .......................................... F04B 35/00
[52] U.S. Cl. .................................. 417/380; 417/401; 92/85 A; 92/85 B; 92/130 D; 92/134
[58] Field of Search ............... 417/401, 380, 399, 364; 92/85 R, 85 A, 85 B, 130 D, 134

[56] References Cited
U.S. PATENT DOCUMENTS

| | | | |
|---|---|---|---|
| 938,522 | 11/1909 | Swain | 417/380 X |
| 1,703,003 | 2/1929 | Harteau | 417/401 |
| 1,993,230 | 3/1935 | Taylor | 417/380 |
| 2,551,073 | 5/1951 | Waldron | 417/380 X |
| 3,106,821 | 10/1963 | Ridgway | 60/30 |
| 3,238,886 | 3/1966 | Johnson | 417/395 X |
| 3,244,357 | 4/1966 | Bunker | 230/52 |
| 3,250,224 | 5/1966 | Phillips et al. | |
| 3,254,604 | 6/1966 | Faisandier | 92/130 D X |
| 3,339,820 | 9/1967 | Graham | 230/52 |
| 3,606,591 | 9/1971 | Potma | 417/364 |
| 4,156,416 | 5/1979 | Weisgerber | 123/196 R |
| 4,218,958 | 8/1980 | Katz et al. | 92/130 D X |

FOREIGN PATENT DOCUMENTS

| | | | |
|---|---|---|---|
| 2933905 | 3/1981 | Fed. Rep. of Germany | 417/380 |
| 717802 | 1/1932 | France | 417/380 |

Primary Examiner—Leonard E. Smith
Attorney, Agent, or Firm—William A. Schuetz

[57] ABSTRACT

A vacuum pump assembly which is driven by pulsating exhaust gases emanating from an internal combustion engine is disclosed. The pump assembly includes a double-acting pump means for pumping air from a vacuum source and having a reciprocable pumping member, an actuating means including a reciprocable actuating member drivingly connected to the pumping member and which is driven through first and second strokes to move the pumping member through first and second strokes, respectively, one side of the actuating member being in communication with the exhaust gases and with the actuating and pumping members being movable through their first strokes during the pressure increasing phase of each pressure pulsation and being moved through their second strokes by a first nonlinear variable rate spring means during each pressure decreasing phase of each pressure pulsation during low to intermediate engine speeds and loads and by both the first and a second nonlinear variable rate spring means during intermediate to high engine speeds and loads whereby the pump assembly is operable to pump air from the vacuum source throughout a wide range of engine speeds and loads including high speeds and loads.

11 Claims, 16 Drawing Figures

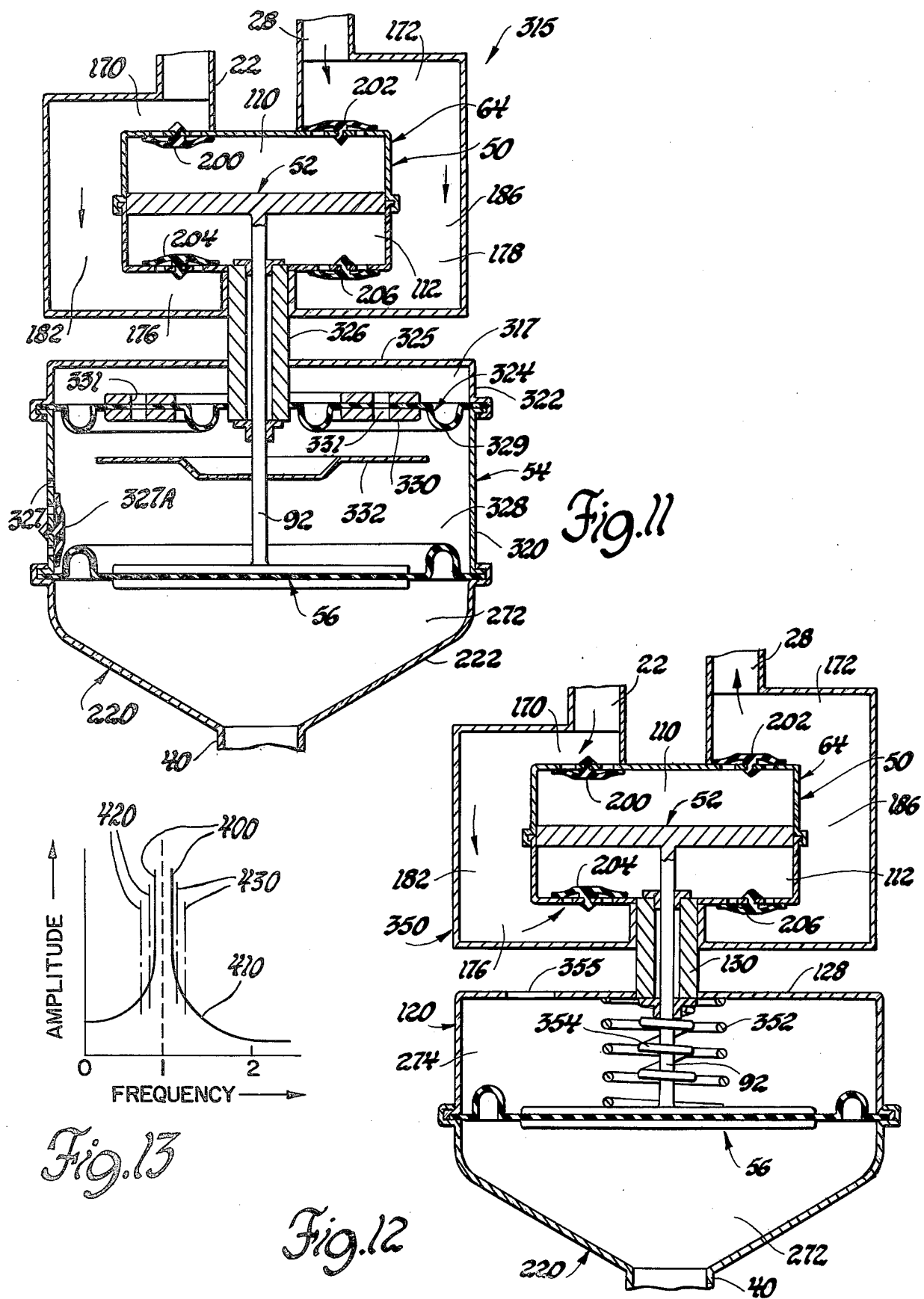

EXHAUST GAS OPERATED VACUUM PUMP ASSEMBLY

The present invention relates to a pump assembly and more particularly to a vacuum pump assembly which is actuated by exhaust gas pressure pulsations emanating from an internal combustion engine.

Current production automotive vehicles contain many pneumatically operated controls or devices, such as power-assist brakes, cruise controls, controls for air conditioning and heating and EGR valves. Proper operation of these controls or devices requires a source of vacuum, which historically has been taken from the intake manifold of the internal combustion engine used to power the vehicle. The pneumatically operated controls or devices have proved to be relatively inexpensive and reliable when there is sufficient intake manifold vacuum. However, with the introduction of the fuel efficient automobiles having smaller engines, the level of vacuum in the intake manifold has decreased to the point where it no longer can be relied upon to operate reliably all of the pneumatically operated controls or devices, especially the power-assist brakes, throughout the entire range of engine speeds and loads. Consequently, if inexpensive pneumatically operated controls or devices are to be used in such vehicles, it is imperative that a source of vacuum other than the intake manifold be provided.

Currently, the assignee of the present invention produces vacuum pump assemblies for providing a reliable source of vacuum apart from the intake manifold vacuum. One such pump assembly has a reciprocable pumping member which is actuated through one stroke via an eccentric cam driven from the crankshaft of the engine and moved through its other or return stroke via a spring means. This pump assembly is substantially like that shown in U.S. Pat. No. 4,156,416, issued May 29, 1979, and assigned to the same assignee as the present invention. Another such pump assembly is similar to that shown in the above-mentioned U.S. patent, but is driven by an electric motor through an eccentric drive rather than by the engine crankshaft. While both of these pump assemblies have been highly satisfactory in operation, they have the drawback that they must be driven by the engine of the vehicle or must be separately driven by an electric motor.

To overcome the use of vacuum pump assemblies which are either driven from the engine or driven by a separate motor means, such as an electric motor, the present invention contemplates using the exhaust gases from the internal combustion engine for operating or actuating a vacuum pump assembly. The advantage of using the exhaust gases as the motive force to operate a vacuum pump assembly is that it provides a "free" or nonparasitic energy source which does not in any way affect or detract from the operation of the internal combustion engine and does not require a further drain on the electrical system of the automotive vehicle.

At this point it should be noted that diaphragm operated fuel pumps have heretofore been provided which are actuated by pressure pulsations taken from either the intake manifold or the crankcase of an engine. Examples of such pumps are shown in U.S. Pat. Nos. 3,238,886 and 3,250,224. It is also known to provide reciprocating pumps for pumping a fluid which are reciprocated by a separate actuating means drivingly connected thereto, the actuating means including a reciprocable diaphragm whose opposite sides are alternately exposed to vacuum from the intake manifold of an engine. Examples of such pump assemblies are illustrated in U.S. Pat. Nos. 3,244,357 and 3,339,830. It is also known to use the pressure pulsations in the exhaust gases from an internal combustion engine to deflect a diaphragm to cause air to be pumped or drawn into the exhaust gases prior to entering an afterburner, as shown in FIG. 1 of U.S. Pat. No. 3,106,821. While FIG. 1 of the latter patent broadly shows a diaphragm operated air pump actuated by the pressure pulsations in the exhaust gases from an internal combustion engine, it is known that the pump thereshown would not be operable as a fluid pressure or vacuum pump over the full range of engine speeds and loads, especially at high speeds and/or loads during wide open throttle conditions.

Studies of the pressure profiles of exhaust gases from a multi-cylinder internal combustion engine show that the exhaust gases emanate as pressure pulsations whose pressure, frequency and amplitude, when approximated to a cyclic sine wave, vary greatly in accordance with engine speed and operating conditions. The frequency of the cyclic operation is typically on the order of 30 Hertz to 150 Hertz. The amplitude of the pressure pulsations is great enough so that subatmospheric pressures usually exist in each exhaust gas pulsation for a short period or portion of each cycle even though the average pressure of the cycle is substantially above atmospheric pressure. In typical internal combustion engine exhaust systems, these subatmospheric pressure periods occur to varying degrees during most engine speeds and loads, but disappear at high engine speeds and high loads where the pressure pulsations during their entire cycle are at above atmospheric pressure.

Accordingly, it is a broad object of the present invention to provide a new and improved pump assembly for pumping a fluid and which is actuated by pressure pulsations in the exhaust gases emanating from an internal combustion engine and which is operable to pump fluid over a wide range of engine speeds and loads including high engine speeds and loads.

Another object of the present invention is to provide a new and improved pump assembly for pumping a fluid which is adapted to be actuated by pressure pulsations in the exhaust gases of an internal combustion engine and in which the pump assembly is operative to pump fluid during engine speeds and loads when a portion or period of the pressure pulsation cycles is below atmospheric pressure and during engine speeds and loads when the pressure pulsation cycles are wholly above atmospheric pressure.

Yet another object of the present invention is to provide a new and improved pump assembly, preferably a vacuum pump assembly, which includes a pump means for pumping a fluid and having a reciprocable pumping member movable through first and second strokes, an actuating means including a reciprocable actuating member drivingly connected to the pumping member and which is adapted to be driven through first and second strokes to move the pumping member through its first and second strokes, respectively, one side of the actuating member adapted to be in communication with exhaust gases from an internal combustion engine and with the pressure pulsations of the exhaust gases causing the actuating member and pumping member to be moved through their first strokes, a first spring means engageable with one of the actuating and pumping members for effecting movement of the actuating and pumping members through their second strokes during all operating speeds and loads of the engine, and a second spring means having a higher spring rate operable in unison with the first spring means to move the actuating and pumping member through their second strokes during engine speeds and loads above a predetermined speed or value and wherein the pump assembly during low speed operation of the engine is operated near its natural frequency to enhance its capacity.

A further object of the present invention is to provide a new and improved pump assembly, as defined in the next preceding object, wherein the first spring means is an air spring means and the second spring means is a mechanical spring means.

An additional object of the present invention is to provide a new and improved pump assembly, as defined in the penultimate object, and wherein the first spring means is an air spring means having a variable spring rate and wherein the second spring means is an air spring means having a higher variable spring rate than the first spring means.

A still further object of the present invention is to provide a new and improved pump assembly, as defined in the preceding objects, and wherein the pump means is a double-acting pump means in which the reciprocable pump member causes fluid to be drawn into a first chamber located adjacent one side thereof and fluid to be expelled from a second chamber adjacent its other side thereof during the first stroke and in which fluid is drawn into the second chamber and expelled from the first chamber during its second stroke whereby the pump means is operable to pump fluid during each stroke of operation.

The present invention further resides in various novel constructions and arrangement of parts, and further objects, novel characteristics and advantages of the present invention will be apparent to those skilled in the art to which it relates and from the following detailed description of the illustrated, preferred embodiments thereof made with reference to the accompanying drawings forming a part of this specification and in which similar reference numerals are employed to designate corresponding parts throughout the several views, and in which:

FIG. 11 is a schematic view of a second embodiment of the pump assembly of the present invention;

FIG. 12 is a schematic view of a third embodiment of the novel pump assembly of the present invention; and FIG. 13 is a graph of deflection versus frequency.

The present invention provides a novel pump assembly 10, preferably for use as a vacuum pump assembly, which is actuated by exhaust gas pressure pulsations emanating from an internal combustion engine.

Figure 1:
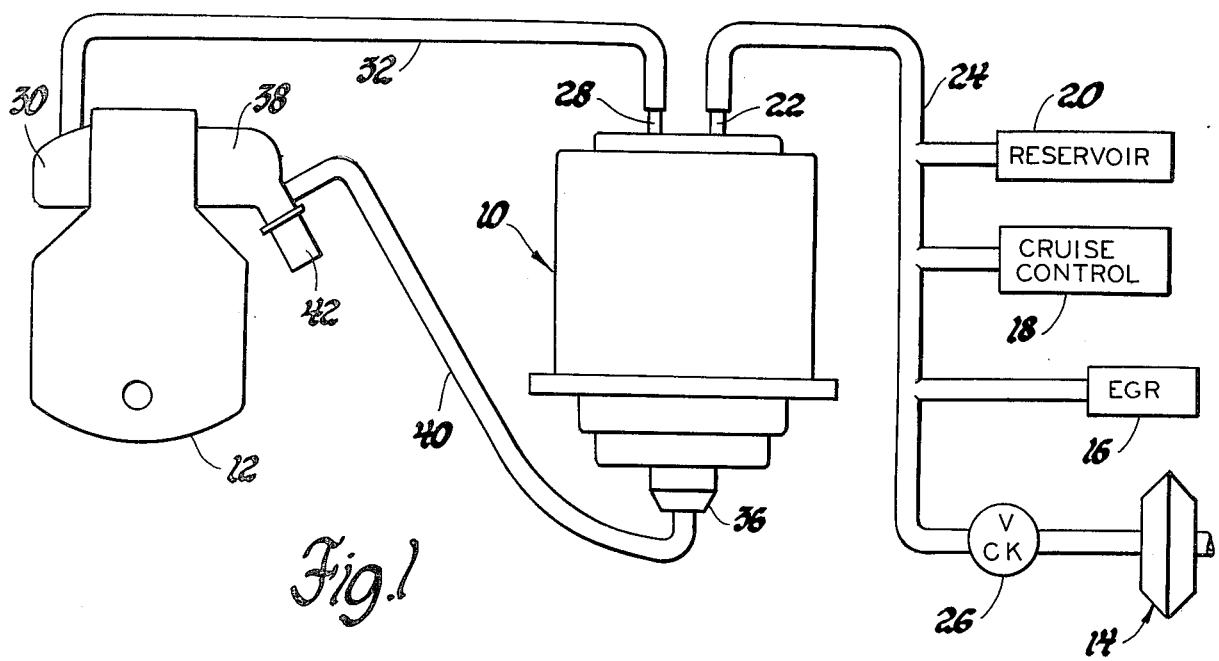
FIG. 1 is a schematic diagram showing the novel pump assembly of the present invention and its use with an internal combustion engine and vacuum control devices.

Referring to the schematic diagram of FIG. 1, the novel pump assembly 10 is thereshown as being interconnected with an internal combustion engine 12 and a plurality of vacuum operated controls or devices, such as a brake booster housing 14, an EGR valve 16, a cruise control device 18, and a vacuum reservoir 20. The vacuum operated control devices 14, 16, 18 and 20 together define a predetermined vacuum control volume. The vacuum pump assembly 10 includes an inlet 22 which is in communication with each of the vacuum control devices 14, 16, 18 and 20 via a conduit means 24 and in the case of the brake booster 14 also via a one-way check valve 26. The vacuum pump assembly 10 also includes an outlet 28 which can be either in communication with the atmosphere or, as illustrated in FIG. 1, is in communication with an intake manifold 30 of the internal combustion engine 12 via conduit means 32.

The vacuum pump assembly 10 is adapted to be actuated by the exhaust gases emanating from the internal combustion engine 12. To this end, the vacuum pump assembly 10 includes a second inlet 36 which is in communication with an exhaust gas manifold 38 of the internal combustion engine 12 via a conduit means 40.

It should be noted at this point that studies of the pressure profiles of exhaust gases for a multicylinder internal combustion engine show that the exhaust gases emanate as pressure pulsations whose pressure, frequency and amplitude, when approximated to a cyclic sine wave, vary greatly in accordance with engine speeds and operating conditions. The pressure profiles will also vary somewhat in accordance with the size and number of cylinders of the internal combustion engine, the configuration of the exhaust system and the location within the exhaust system where the pressure profile is measured. In the illustrated schematic view of FIG. 1, the exhaust gas pressure pulsations for use with the novel pump assembly 10 are taken from a location adjacent the juncture of the outlet of the exhaust gas manifold 38 and a tailpipe 42. It will, of course, be understood that in some pump applications other locations for picking up exhaust gas pressure pulsations may be more desirable.

It has been found that, in general, the frequency of the cyclic operation of exhaust gas pressure pulsations is typically on the order of 30 to 150 Hertz. The amplitude of the pressure pulsations is such that, for most engine speeds and loads, subatmospheric pressures exist in each exhaust gas pressure pulsation cycle for a short period of each cycle even though the average pressure of the cycle is substantially above atmospheric pressure.

While such subatmospheric pressure periods occur to varying degrees during most engine speeds and loads, they disappear during high engine speeds and loads wherein the pressure of the pressure pulsations during their entire cycle is above atmospheric pressure.

Figure 2A:
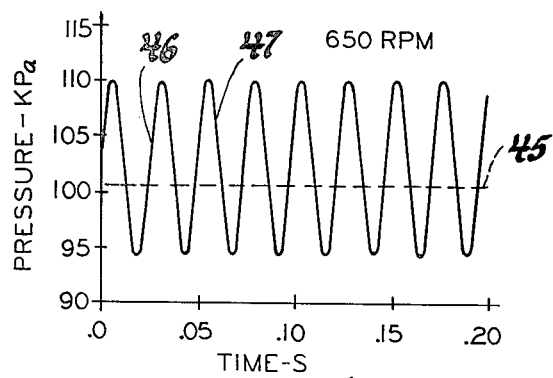
FIGS. 2A-2D are graphs showing exhaust gas pressure profiles when approximated to a cyclic sine wave at different engine speeds.
Figure 2B:
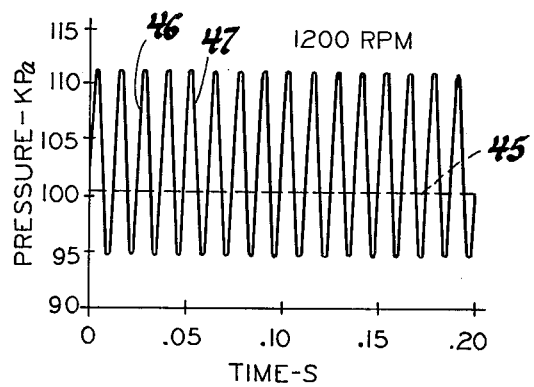
Figure 2C:
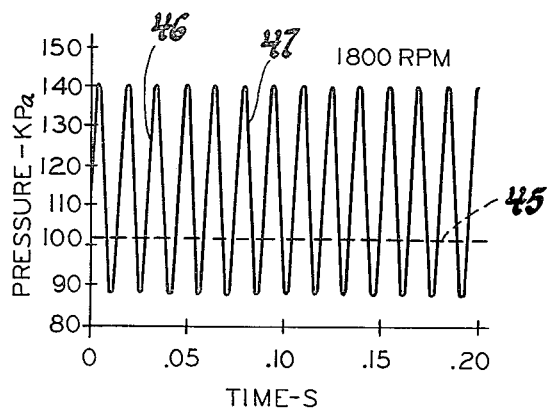
Figure 2D:
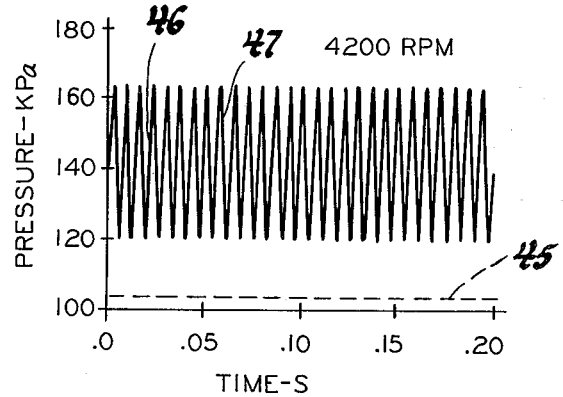
Figure 3:
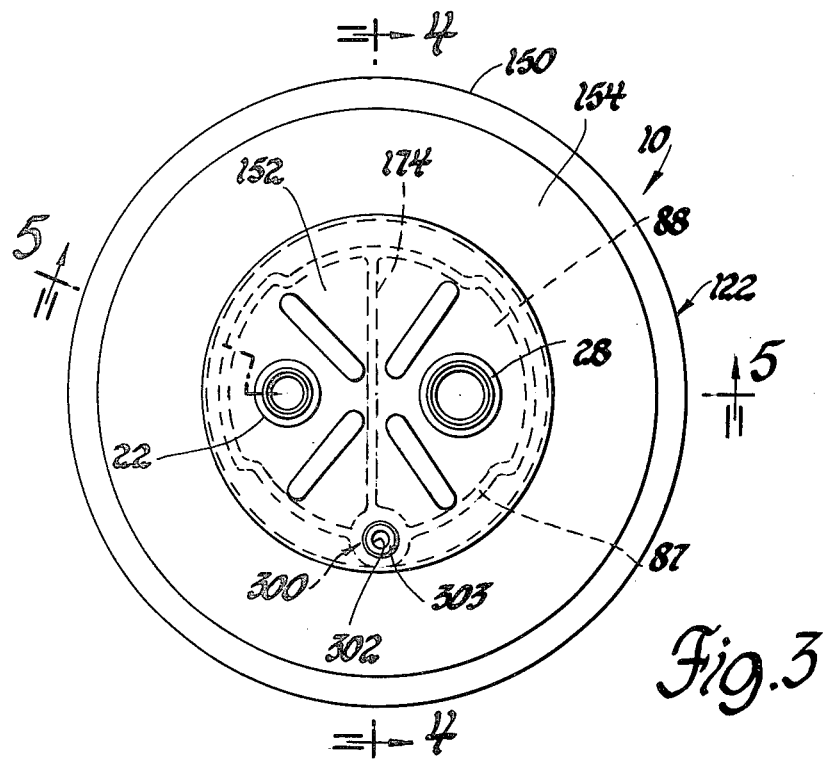
FIG. 3 is a top plan view of the preferred embodiment of the novel pump assembly of the present invention.

As an illustrative example, FIGS. 2A-2D show exhaust gas pressure pulse profiles, when approximated to a cyclic sine wave, of exhaust gases emanating from a 2.5 liter four-cylinder internal combustion engine. FIG. 2A illustrates the exhaust gas pressure profile at idle speed (approximately 650 rpm), FIG. 2B illustrates the exhaust gas pressure profile at approximately 1200 rpm and half load, FIG. 2C illustrates the exhaust gas pressure profile at approximately 1800 rpm and full load, and FIG. 2D shows the exhaust gas pressure profile at approximately 4200 rpm and full load or wide open throttle. The vertical side of each of the graphs of FIGS. 2A-2D illustrates the pressure in kPA and the horizontal side indicates time in seconds. Atmospheric pressure is at approximately 101 kPA and is illustrated by a horizontally extending dotted line 45 on each of the graphs 2A-2D.

As can be seen from FIG. 2A, the exhaust gas pressure pulsations at approximately idle speed have an amplitude which varies between 95-110 kPA and a frequency of approximately two cycles for each 0.05 seconds. At approximately 1200 rpm (FIG. 2B) the pressure variance of the pressure pulsations remains approximately the same as it was at idle speed, but that the frequency thereof has increased to approximately twice that of idle speed or about 4 cycles for each 0.05 seconds. At 1800 rpm (FIG. 2C) the pressure of the pressure pulsations varies between approximately 90-140 kPA, but the frequency of the pressure pulse cycles decreases slightly from that shown at 1200 rpm (FIG. 2B). At 4200 rpm (FIG. 2D) the pressure pulsations vary between approximately 120 and 160 kPA and the frequency of the pulse cycles is approximately double that shown at 1800 rpm (FIG. 2C).

Each cycle for each pressure pulsation can be defined as having a pressure increasing phase 46 and a pressure decreasing phase 47 and with each cycle constituting one frequency. As can be seen from the graphs of FIGS. 2A-2C, for each cycle of operation of each pressure pulsation, a portion or short period thereof is at a pressure which is below atmospheric pressure as indicated by the dotted line 45. This subatmospheric pressure period occurs to a progressively lesser degree as the engine speed increases up to an engine speed somewhat higher than 1800 rpm, but disappears entirely at high load engine speeds above that figure. This is shown in the graph of FIG. 2D wherein the entire cycle of operation for each pressure pulsation at approximately 4200 rpm takes place at a pressure substantially above atmospheric pressure, as indicated by the dotted line 45.

From the above, it should be apparent that in order to utilize exhaust gas pressure pulsations as a motive force to actuate a vacuum pump assembly, the pump assembly must be designed to operate even though the pressure of the exhaust gas pulsations varies widely and even though the pressure pulsations at various engine speeds includes subatmospheric portions or periods while at other engine speeds the pressure pulsations are wholly above atmospheric pressure. The novel pump assembly 10 of the present invention meets this criteria.

Figure 5:
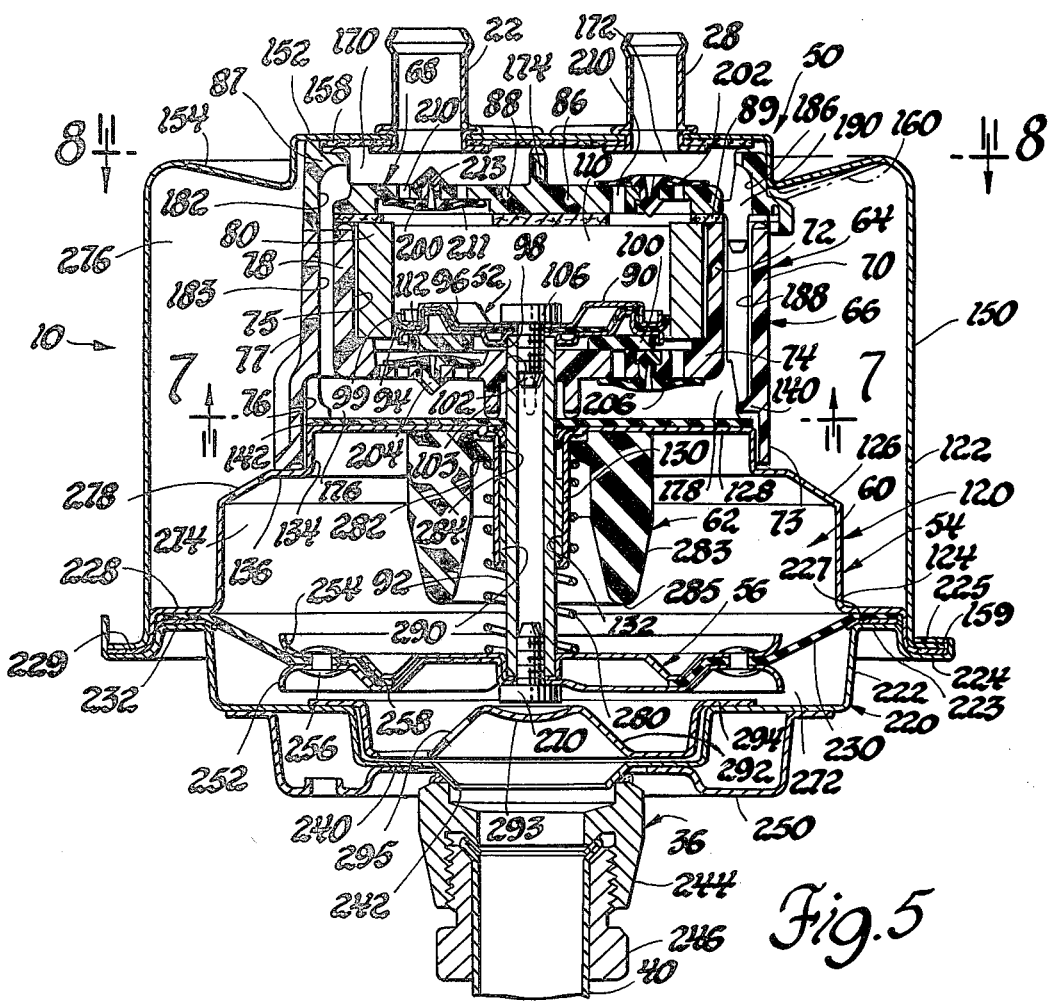
FIG. 5 is a cross-sectional view of the pump assembly shown in FIG. 3, with portions shown in elevation, taken approximately along line 5—5 of FIG. 3.

Referring to FIG. 5, the novel pump assembly 10 comprises, in general, a double-acting pump means 50 including a reciprocable pumping member or piston assembly 52 movable through first and second strokes for drawing air from the vacuum control devices 14, 16, 18, 20 and expelling air to the intake manifold 30 during each stroke of operation, an actuating means 54 including a reciprocable actuating member or diaphragm assembly 56 drivingly connected to the reciprocable piston assembly 52 and which is movable through first and second strokes to move the piston assembly 52 through its first and second strokes, the inlet means 36 for communicating the exhaust gases to one side of the reciprocable diaphragm assembly 56 and with the pressure pulsations of the exhaust gases during their pressure increasing phase causing the diaphragm assembly 56 and piston assembly 52 to be moved through their first stroke and during their pressure decreasing phase of each pressure pulsation allowing the piston assembly 52 and the diaphragm assembly 56 to be moved through their second stroke, a first variable rate spring means 60 for aiding or effecting movement of the diaphragm assembly 56 and the piston assembly 52 through their second stroke during the pressure decreasing phase of each pressure pulsation during low speed and load operation of the engine and a second variable rate spring means 62 which is operable in unison with the first spring means 60 to return the pumping member 52 and actuating member 56 through their second stroke during the pressure decreasing phase of each pressure pulse operation during high speed and load operation of the engine.

The pump means 50 for pumping air from the vacuum control devices 14, 16, 18 and 20 to the intake manifold 30 of the internal combustion engine 12 includes a pump housing means 64 having a pump body assembly 66 and a cover assembly 68. As shown in FIG. 5 the pump body assembly 66 includes a one-piece molded plastic housing member 70. The housing member 70 is generally cylindrically shaped and has a generally cup-shaped upper end portion 72 and a generally cup-shaped lower end portion 73, as viewed in FIG. 5, facing in opposite directions and a radially extending common wall 74 located intermediate the upper and lower ends of the housing member 70. The cup-shaped upper end portion 72 has a cylindrically shaped inner wall surface 75 and the cup-shaped lower end portion 73 has a cylindrically shaped inner wall surface 76 of a larger diameter than the inner wall surface 75. The upper and lower end portions 72 and 73 of the housing 70 have a common generally cylindrically shaped outer wall surface 77 which is spaced radially outwardly from the inner wall surfaces 75 and 76 and which defines with the inner wall surfaces 75 and 76 a generally cylindrically shaped section or wall 78 of a given radial thickness. Slidably received within the inner annular wall surface 75 of the cup-shaped upper end portion 72 is an aluminum, cylindrically shaped, tubular liner 80 whose lower end is in abutting and sealing engagement with the radially extending common wall 74 of the housing 70.

The pump housing means 64 also includes the cover assembly 68 which overlies the cup-shaped end portion 72 of the body housing 70. The cover assembly 68 includes a one-piece molded plastic cup-shaped cover member 86 having a generally cylindrically shaped side wall 87 and a bottom wall 88. A gasket 89 is interposed between the upper end of the cup-shaped portion 72 of the body housing 70, as viewed in FIG. 5, and the bottom wall 88 of the cover assembly 68. The gasket 89 provides an outer peripheral seal between the cover housing 86 and the body housing 70 and the top of liner 80.

The pump means 50 further includes the piston assembly 52. The piston assembly 52 comprises a reciprocable piston means 90 and a piston rod 92. As best shown in FIG. 5, the piston means 90 comprises an annular seal 94, preferably made from polytetrafluoroethylene, a cover plate 96 and a retainer plate 98. The cover and retainer plate 96 and 98 are preferably made from stainless sheet steel and the annular seal 94 is made from sheet material. The annular seal 94 is sandwiched between the cover plate 96 and the retainer 98 and the three items are stamped at annularly spaced locations to provide a generally undulated crosssectional shape, as viewed in FIG. 5, and with the seal at its outer edge 99 extending radially outwardly of the cover plate 96 and retainer ring 98. The undulated shape increases the rigidity of the piston 52 and the annular seal 94 at its outer edge 99 has an outer diameter which is slightly larger than the inner diameter of the cylindrical liner 80 so that when the piston 52 is slidably received within the liner 80 the annular seal 94 is bent and self-biased into engagement with the inner surface of the liner 80. The piston 52 also has an annular washer shaped rubber bumper 100 suitably adhesively secured to its underside to reduce noise and cushion shock to shaft 92 when the piston assembly 52 engages the wall 74 of the housing 66.

The piston assembly 52 is secured to one end of the piston rod 92. The piston rod 92 comprises a hollow metal sleeve which is slidably received through a central aperture 102 in a hub portion 103 integral with the wall 74 of the housing member 66. The piston 52 is secured to one end of the hollow piston rod 92 by a suitable threaded bolt 106.

As noted hereinbefore, the piston assembly 52 is adapted to be slidably received within the liner 80 carried by the cup-shaped portion 72 of the housing 66. As viewed in FIG. 5, the piston 52 divides the space defined by the cup-shaped housing portion 72 and the end cover assembly 68 into upper and lower chambers 110 and 112.

The pump body housing 66 and cover assembly 68 are retained in assembled relationship with each other by a housing assembly 120 of the actuating means 54 and a shell or housing 122. The housing assembly 120 includes a one-piece shell or housing 124 made from galvanized sheet steel and stamped to the configuration shown in FIG. 5. The housing 124 is generally cup-shaped and comprises an annular stepped side wall 126 and a generally planar base 128. As shown in FIG. 5, the base 128 at its center is stamped so as to provide a downwardly, axially extending tubular portion 130 having a central through aperture 132. The annular side wall 126 includes a first axially extending portion 134 adjacent its base 128 and a radially extending portion 136 to define a first step. The body housing 66 of the pump means 50 at its cup-shaped end portion 73 is slidably received over the axially extending portion 134 of the housing 124 until a radially inwardly extending annular shoulder 140 on the end portion 73 is in engagement with the base 128 of the housing 124. Interposed between the shoulder 140 and the base 128 of the housing is a suitable gasket seal 142. The cup-shaped end portion 73 and the annular shoulder 140 serve to position the housing 66 on the housing 124 and to restrain the housing 66 against radial movement relative to the housing 124.

The pump assembly 50 is biasingly held into engagement with the base 128 of housing member 124 by the shell 122. The shell 122 is generally cup-shaped and includes a cylindrical side wall portion 150, a flat end wall portion 152 and a generally S-shaped end wall portion 154 between the flat end portion 152 and the side wall portion 150. The end wall portion 152 of the housing member 122 suitably carries or has secured thereto a pair of spaced tubular nipples to define the outlet 28 and the inlet 22 of the pump means 50. Interposed between the inside surface of the end wall portion 152 of the housing 122 and the uppermost annular end of the cover assembly 68 of the pump means 50, as viewed in FIG. 5, is a suitable gasket seal 158. The side wall 150 of the housing member 122 includes a radially outwardly extending flange 159 at its free or lower end which bears against the housing 124 and which serves to secure the housing 122 to the housing assembly 120, and in the manner to be hereinafter more fully described.

The shell 122 is adapted to biasingly hold the pump means 50 in assembled relation and against the base 128 of the housing assembly 120. To this end, the shell 122 is preferably stamped from spring steel and the S-shaped portion 154 serves as the spring to exert a downward biasing force, as viewed in FIG. 5, against the cover assembly 68 of the pump means 50, which in turn holds the cover assembly 68 against the pump housing 66 which in turn holds the housing 66 against the base 128 of the housing assembly 120. As best shown in FIG. 5, the S-shaped portion of the housing 120 normally has a free state position, as indicated by the dotted line 160. During assembly the planar end or base 152 of the housing member 122 will engage the pump means 50 and be deflected from its free state or dotted line position, as indicated by the reference numeral 160, to the solid line position shown in FIG. 5. This exerts a downward self-biasing force against the pump means 50 to maintain the same in assembled relation and also serves to insure that the respective gasket seals 158, 89 and 142 provide a good seal between the interior of the pump means 50 and the exterior of the pump means 50. The self-biasing force of the outer shell 122 additionally serves to take up any shrinkage in the plastic cover member 86 and body housing 66 of the pump means 50 due to aging, etc. during the lifetime use of the pump assembly 10.

Figure 7:
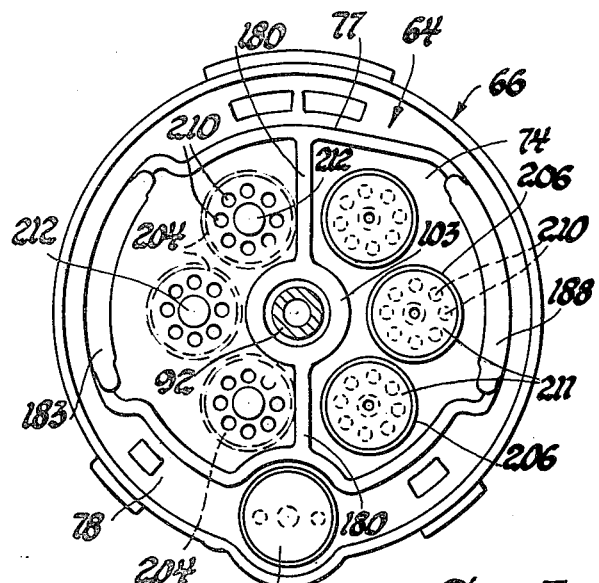
FIG. 7 is an end elevational view of part of the pump assembly shown in FIG. 5 and looking in the direction of the arrows 7—7 of FIG. 5.
Figure 8:
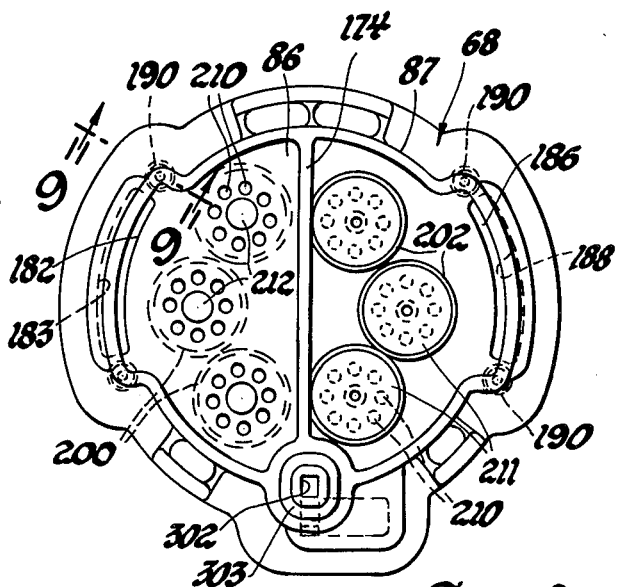
FIG. 8 is an end elevational view of part of the pump assembly shown in FIG. 5 and looking in the direction of the arrows 8—8 on FIG. 5.

As best shown in FIG. 5, when the pump means 50 is held in assembled relationship with the actuating means 54, the cup-shaped cover assembly 68 defines with the gasket 158 and end wall portion 152 of the housing member 122 a pair of chambers 170 and 172. As best shown in FIGS. 5 and 8, chambers 170 and 172 are separated from each other by a diametrically extending rib 174 which is integral with and extends upwardly from the bottom wall 88 of the cup-shaped housing member 86 and has its upper end in sealing engagement with the gasket 158. The chamber 170 is in direct communication with the inlet nipple 22 and the chamber 172 is in direct communication with the outlet nipple 28. Likewise, the end portion 73 of the pump housing 66 defines with the gasket 142 and the end wall 128 of the housing 120 a pair of chambers 176 and 178. As best shown in FIGS. 5 and 7, the chambers 176 and 178 are separated from each other by a pair of radially extending ribs 180 integral with the bottom wall 74 and which are diametrically aligned and extend from hub portion 103 to the outer side wall of the pump body housing 66.

These ribs 180 at their lower ends sealably engage the gasket 142.

Figure 9:
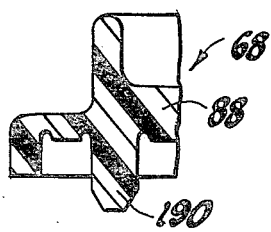
FIG. 9 is an enlarged cross-sectional view of part of the pump assembly shown in FIG. 8 and looking in the direction of the arrows 9—9 on FIG. 8.

The chambers 170 and 176 are in direct communication with each other via axially and arcuately extending slots 182 and 183 in the side wall 87 of the cover assembly 68 and the side wall 78 of the pump housing 66, respectively. The slots 182 and 183 are respectively aligned and define a through opening to communicate the chambers 170 and 176. Likewise the chambers 172 and 178 are in direct communication with each other via axially and arcuately extending aligned slots 186 and 188 respectively formed in the side wall 87 of the cover assembly 68 and the side wall 78 of the pump housing 66, respectively. To insure alignment of the slots 182 and 184 and 186 and 188 and to prevent relative rotation between the cover member 86 and the pump housing 66, the cover member 86 includes a plurality of arcuately spaced, axially extending locator and retainer pins 190 which are received within the opposite ends of the openings 184 and 188 in the pump housing 66, as best shown in FIGS. 6, 8 and 9.

The pump means 50 also includes a plurality of one-way check valve means for controlling communication between the chambers 110 and 112 and the inlet 22 and for controlling communication between the chambers 110 and 112 and the outlet 28. To this end, the pump cover member 86 is provided with check valve means 200 for controlling communication between the inlet 22 and the chamber 110 and check valve means 202 for controlling communication between the chamber 110 and the outlet nipple 28. Likewise the pump housing 66 is provided with check valve means 204 for controlling communication between chamber 112 and chamber 176 and one-way check valve means 206 for controlling communication between chamber 178 and chamber 112. Each of check valve means 200, 202, 204 and 206 preferably includes three arcuately spaced check valves.

Each check valve of each check valve means 200 and 202 and 204 and 206 comprises a plurality of axially extending annularly spaced openings 210 extending through the bottom wall 88 of the cover member 86 or through the wall 74 of the pump housing 66. Each of the check valves of each of the check valve means 200, 202, 204 and 206 also includes an umbrella-shaped valve made from a suitable elastomeric flexible material. Each umbrella valve includes a cover portion 211 and an integral headed stem portion 212 which is received in openings 213 in the cover member 86 or the bottom wall 74 of the pump housing 66 and snap fittingly retained thereon. The cover portion 211 of the umbrella valves overlie the openings 210 and are self-biased to a closed position in which they overlie the openings 210 and engage the cover member 86 or bottom wall 74 of the pump housing 66.

Figure 6:
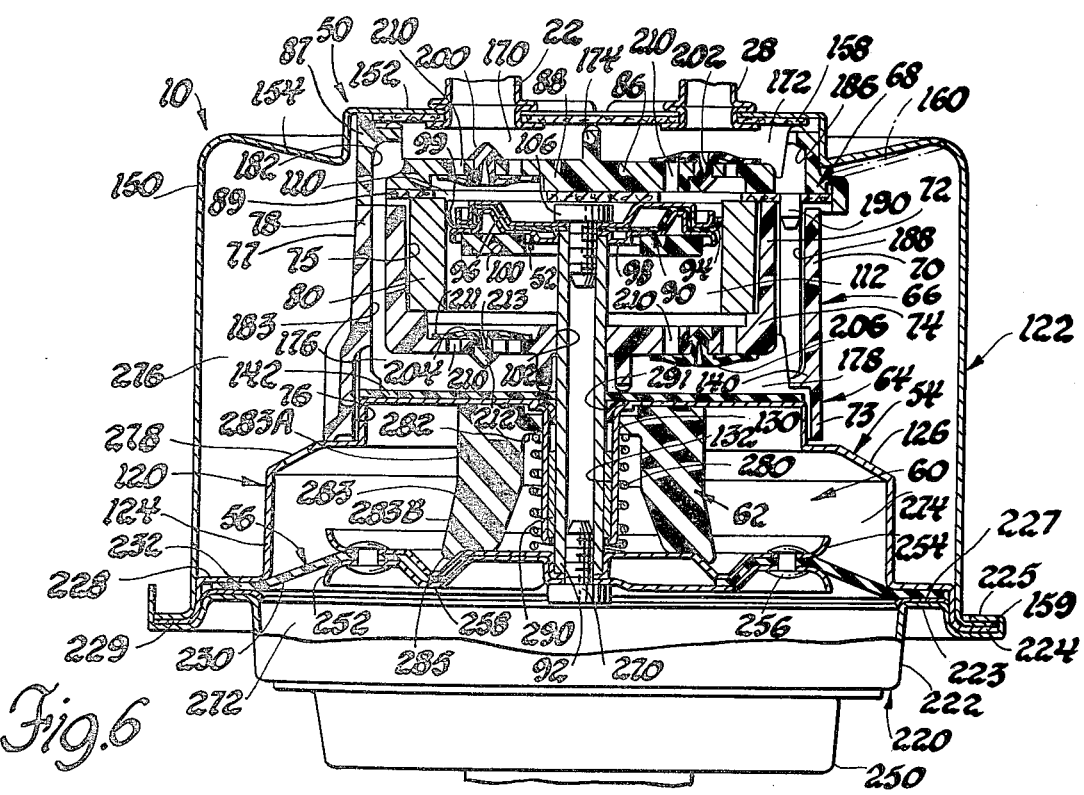
FIG. 6 is a cross-sectional view like that shown in FIG. 5, but showing various parts in different positions.

In operation, when the piston assembly 52 is moved upwardly through its first stroke relative to the pump housing 66 from the position shown in FIG. 5 toward the position shown in FIG. 6, air is drawn from the vacuum operated devices 14, 16, 18 and 20 through the inlet 22, chamber 170 and from there through the openings 182 and 184 into the chamber 176. As the piston assembly 52 moves upwardly and thereby decreases the pressure in chamber 112, the check valves 204 will open to allow air to flow from chamber 176 into chamber 112 via openings 210. At the same time air contained in chamber 110 is pressurized and caused to be expelled past the check valves 202 into the chamber 172 and from chamber 172 into the outlet 28. During this upward movement of the piston assembly 52, check valves 206 remain closed to block communication between chamber 178 and chamber 112, since the pressure in chamber 178 exceeds the pressure in chamber 112 and check valves 200 remain closed to block communication between chambers 110 and 170 because the pressure in chamber 110 will exceed the pressure in chamber 170.

During the reverse or downward movement of the piston assembly 52 through its second stroke from the position as shown in FIG. 6 toward the position shown in FIG. 5, air is drawn from the vacuum operated devices 14, 16, 18 and 20 through inlet 22 into chamber 170 and then past the check valves 200 into chamber 110 via openings 210 and air contained in chamber 112 is expelled via check valves 206 into chamber 178. From there the air is expelled through apertures 186 and 188 into the chamber 172 and then out through outlet 28. During this reverse or downward movement, check valves 202 remain closed to block communication between chambers 172 and 110, since the pressure in chamber 172 exceeds the pressure in chamber 110 and check valves 204 remain closed, since the pressure in chamber 112 will exceed the pressure in chamber 176. It should thus be apparent that the operation of the pump means 50 is such that it is a double-acting pump in which both air is drawn in and expelled during each stroke of operation of the piston assembly 52.

The piston assembly 52 is adapted to be reciprocated through its first and second strokes by the actuating means 54. The actuating means 54 comprises the housing assembly 120, a bonnet assembly 220 and the diaphragm assembly 56. The bonnet assembly 220 includes a stainless steel housing 222 which is stamped to a generally stepped cup-shaped configuration, as shown in FIG. 5. The bonnet housing 222 adjacent its upper and outer end, as viewed in FIG. 5, is stepped to provide first and second axially spaced annular flange portions 223 and 224 and is provided with an annular crimp ring 225 at the outer peripheral edge of the flange portion 224. Overlying the annular flange portion 223 of the bonnet housing 222 is an annular, stepped clamp ring 227 made from a suitable readily deformable material.

The diaphragm assembly 56 includes a fabric impregnated elastomeric flexible diaphragm 230 having an outer peripheral portion 232 which overlies the clamp ring 227. The shell 124 of the housing assembly 120 includes a stepped outer peripheral portion having first and second annular axially spaced flange portions 228 and 229 shaped complementary to and overlying the flange portions 223 and 224 of the bonnet housing 222, respectively. Overlying the flange portion 229 of the housing 124 is the radially extending annular flange 159 of the shell member 122. The outer flange portion 223 and 224 of the bonnet housing 222, the stepped clamp ring 227, outer peripheral portion 232 of the diaphragm 230, the flange portion 228 and 229 of the housing 124 and the flange 159 of the housing 122 are assembled together and then the annular crimp wing 225 of the bonnet housing 122 is bent and folded inwardly over the flange 159 to crimpingly retain the same in their assembled relationship. This type of stepped flange and crimp connection securely clamps the outer portion 232 of the diaphragm assembly 56 in position and also provides a good seal between the housing 124 and bonnet assembly 220.

The bonnet housing 222 adjacent its bottommost wall portion 240 is provided with an axially extending through opening 242 and carries a suitable nut or fitting 244 welded thereto and surrounding the opening 242. The nut 244 and the opening 242 define the inlet 36. The conduit 40 is suitably secured to the nut 244 by a suitable compression fitting 246 which is threadably received secured to the nut 244. The bonnet assembly 220 in addition has an annular bracket 250 suitably welded thereto for mounting the pump assembly 10 to a suitable bracket or support (not shown) carried by the vehicle.

The diaphragm assembly 56 besides the diaphragm member 230 also includes an annular stainless steel cover 252 and an annular retainer 254 respectively clamped to the opposite sides thereof. The cover and retainer 252 and 254 are of a lesser diameter than the diaphragm 230 so that the latter is allowed to flex and are secured to the diaphragm 230 by rivets 256. The diaphragm assembly 56 is stamped to the configuration shown in FIG. 5 so as to provide an undulated annular ridge 258 to increase the strength of the diaphragm assembly 56. The diaphragm assembly 56 at its mid-portion is clamped to the lower end of the piston rod 92 by a threaded bolt 270.

The diaphragm assembly 56 divides the actuating means 54 into a pair of chambers 272 and 274. The chamber 272 is defined by the bonnet housing 222 and the diaphragm assembly 56 and is at all times in communication with the exhaust gases via the inlet means 36. Chamber 274 is defined by the diaphragm assembly 56 and the housing assembly 120. Chamber 274 is at all times in communication with a chamber 276 via openings 278 contained in housing member 124. Chamber 276 is defined by the outer shell 122, the outside of the pump means 50 and the housing member 124. The chambers 274 and 276 together define a first variable rate air spring means.

The diaphragm assembly 56, when the pump assembly 10 is not operating, is normally biased to its solid line position, as shown in FIG. 5, by a light compression spring 280. The compression spring 280 is located in chamber 274 and has one end in abutting engagement with the retainer 254 of the diaphragm assembly 56 and its other end in abutting engagement with a planar end wall 282 of the second variable rate mechanical spring means 62. The variable rate spring means 62 is made from a one-piece, temperature resistant, elastomeric material and is generally cup-shaped to define the planar bottom wall 282 and an axially extending annular side wall 283. The bottom wall 282 has an opening 284 therethrough through which the tubular portion 130 of the housing member 124 extends. The spring means 62 is suitably bonded to the base 128 of the housing member 124 and the upper end of the compression spring 280 surrounds the tubular portion 130 of the housing member 124 to restrain lateral movement of the compression spring 280. The annular side wall 283 of the spring means 62 includes a cylindrically shaped portion 283A integral with the bottom wall 282 and a tapered portion 283B which terminates in a rounded free end 285. The tapered portion 283B has a radial wall thickness which progressively decreases proceeding from the cylindrical portion 283A toward the free end 285. The side wall 283 has its interior annular surfaces radially spaced from the compression spring 280 and tubular portion 130 of the housing member 124 so that the annular side wall 283 can be deflected and compressed toward the base 128 of the housing member 124 by the diaphragm assembly 56 when the latter engages the free end 285 thereof. The deflectability of the side wall 283 can be increased by providing axially extending openings or recesses (not shown) in the side wall 283.

The piston rod 92 extends through the tubular portion 130 of the housing member 124 and is slidably supported for reciprocable movement with a minimum of friction by an annular bearing 290 suitably carried by the tubular portion 130. An annular washer-shaped Teflon ® seal 291 is provided to prevent or minimize leakage of fluid between chamber 274 of the actuating means 54 and the pump means 50. The seal 291 is made by cutting a thin washer from the end of a Teflon ® tube whose inner diameter is less than the outer diameter of the piston rod 92. The washer-shaped seal 291 is then cold formed or force fitted over the piston rod 92 so that its inner peripheral portion is deflected or bent as shown in FIGS. 5 and 6. The seal 291 adjacent its outer periphery is clamped between the tubular portion 130 of the housing member 124 and the hub portion 103 of the pump body housing 66 via the gasket 142 so as to position the same and hold it in place.

The aforedescribed seal 291 is flexible and self-biased toward its normal free state condition in which it would be planar and thus, it will at all times sealingly engage the piston rod 92. Since the seal 291 is a thin washer and made from Teflon ®, it will sealingly engage the piston 92 with a minimum of friction. Another advantage of the seal 291 is that its self-biasing force toward its normal free state condition increases as the temperature ambient thereto increases and thus, the sealing engagement with the piston rod 92 is enhanced during high temperature and pressure operation of the pump assembly 10.

To prevent direct or head on impingement of the exhaust gases against the diaphragm assembly 56, a baffle plate 292 suitably welded to the bonnet housing 222 is provided. The baffle plate 292 has an inverted cup-shaped or U-shaped central portion 293 and a stepped outer annular flanged portion 294 shaped complementary with the adjacent portion of the bonnet housing 222 and suitably welded thereto. The central portion 293 has a dished bottom and an annular side wall provided with annularly spaced through openings 295. The central portion 293 serves to deflect or direct the exhaust gases emanating from conduit 40 sideways through the openings 295 into the chamber 272. The baffle plate 292 thus prevents direct or head-on impingement of the hot exhaust gases against the diaphragm assembly 56.

The baffle plate 292 also serves as a heat dissipation means to dissipate the heat of the exhaust gases to the housing 222 of the bonnet assembly 220. This heat dissipation function of the baffle plate 292 aids in prolonging the life of the diaphragm assembly 56, since high temperatures can deleteriously affect the life of diaphragms.

Figure 10:
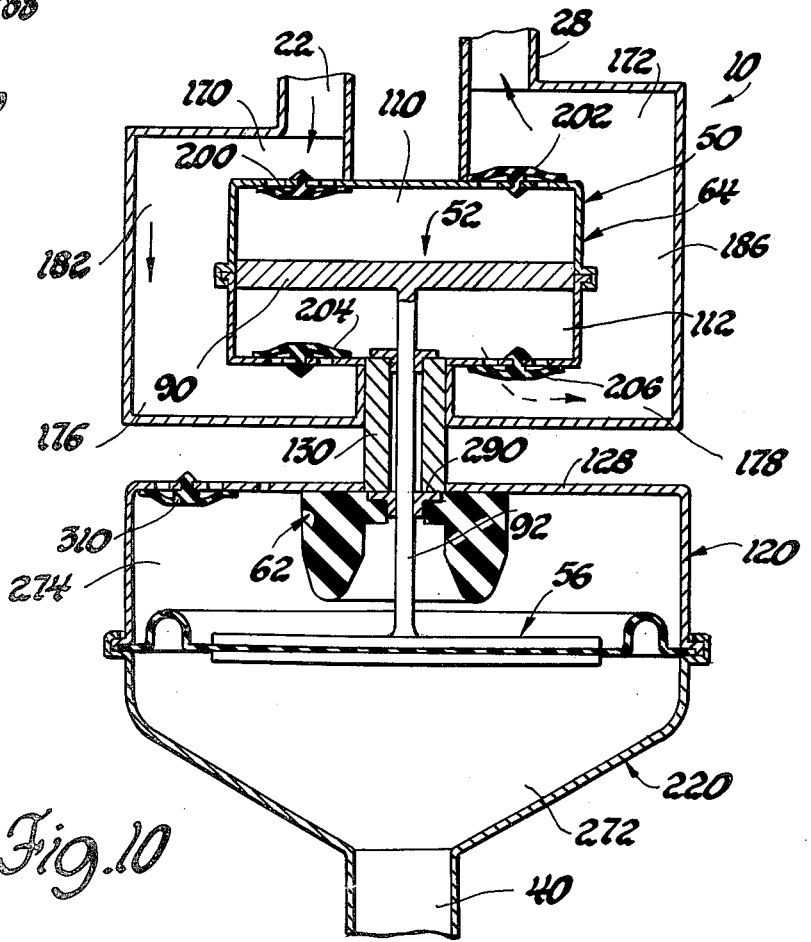
FIG. 10 is a schematic view of the pump assembly shown in FIG. 5.

FIG. 10 is a schematic view of the pump assembly 10 described in connection with FIGS. 5 and 6, and the same reference numerals have been used to designate corresponding parts. The operation of the pump assembly 10 will now be described and reference can be made either to FIGS. 5 and 6 or to the schematic view shown in FIG. 10.

In operation, the exhaust gases emanating from the internal combustion engine 12 are in the form of pressure pulsations. The exhaust gases flow via conduit 40 through the inlet 36 and are deflected by the baffle plate 292 through the apertures 295 into the chamber 272. During low through medium engine speeds, the pressure pulsations in the exhaust gases during their pressure increasing phase of each pulse cycle will cause the diaphragm assembly 56 to be deflected upwardly, as viewed in FIGS. 5 or 10, when the exhaust gas pressure in chamber 272 times the area of the diaphragm assembly 56 plus the pressure in chamber 112 of the pump means 50 times the area of the piston assembly 52 exceeds the combined forces of the pressure in chamber 274 times the area of the diaphragm assembly 56, the pressure in chamber 110 times the area of the piston assembly 52, the biasing force of the light compression spring 280 and any friction and resistance to movement. This upward movement of the diaphragm assembly causes the piston assembly 52 of the pump means 50 be moved through its first stroke to cause air to be expelled from chamber 110 and air to be drawn into chamber 112, and in a manner previously described. This upward movement of the diaphragm assembly 56 also causes the air in chambers 274 and 276 to begin to be compressed and thereby exert an opposing biasing force on the diaphragm assembly 56. This upward movement of diaphragm assembly 56 continues until the pressure pulse reaches the peak of its pressure increasing phase.

It should be noted at this juncture that whenever the diaphragm and piston assemblies 56 and 52, respectively, are moved through their strokes that some slight additional movement will normally take place beyond their position at the time the pulse cycle is at its peak or bottom. This is due to inertia forces or effects acting on the assemblies 56 and 52 and the piston rod 92. For the sake of brevity, this inertia effect will not be repeated in the operational description of the pump assemblies which follows.

When the exhaust gas pressure pulsation begins its pressure decreasing phase of each cycle the air spring means defined by the now compressed air in chambers 274 and 276 in addition to the light compression spring 280 will cause the diaphragm and piston assemblies 56 and 52 to be moved through their second stroke in the downward direction, as viewed in FIGS. 5 and 10. This movement occurs when the pressure in chamber 274 times the area of the diaphragm assembly 56 plus the pressure in chamber 110 times the area of the piston assembly 52 and plus the biasing force of the light compression spring 280 exceeds the pressure in chamber 272 times the area of the diaphragm assembly 56 plus the pressure in chamber 112 times the area of the piston assembly 52 and any friction. During this downward movement air will be drawn into the inlet chamber 110 of the pump means 50 and air will be expelled from the chamber 112 of the pump means 50, and in a manner hereinbefore described. This downward movement of the diaphragm assembly 56 will continue through the pressure decreasing phase until the next pressure pulsation tends to move the same upwardly during its pressure increasing phase.

It should be noted that during low through moderate speed operations of the engine, the pressures of the exhaust gas pressure pulsations are such that the diaphragm assembly is deflected upwardly and downwardly through an amplitude or displacement stroke which takes place adjacent the lower end of the actuating means 56, as viewed in FIGS. 5 and 10, and that the piston assembly 52 is reciprocated back and forth through a displacement adjacent the lower end of the pump means 50. Thus during these conditions of operation, the pump means 50 operates to pump the major portion of the fluid being pumped through the chamber 112 and not the chamber 110. Also during these conditions of operation the resistance of the air spring means is light so as to allow the diaphragm assembly 56 to be flexed through a sufficient displacement stroke to effect a pumping action which is sufficient to supply the needed vacuum to operate the vacuum devices 14, 16, 18 and 20 at moderate engine speeds and loads and to supply sufficient vacuum in conjunction with the vacuum of the intake manifold at idle or very low engine speeds and loads. It should also be noted that during these engine speeds and loads the second variable rate spring means 62 is not engaged by the diaphragm assembly 56 and does not aid in returning the diaphragm assembly 52 through its second stroke.

When the engine of the internal combustion engine 12 is operating during a medium range of engine speed and loads, such as 1800 rpm at one-half load, the pressure of the pressure pulsations will be increased over that at low or moderate engine speeds. During such engine speed operation, the diaphragm assembly 56 will be deflected upwardly during the pressure increasing phase of each pressure pulsation and engage the mechanical spring means 62 to cause the same to be deflected and bulge radially, as shown in FIG. 6. During this range of engine speed and load operation, the displacement stroke of the diaphragm and piston assemblies 56 and 52 is at or near its maximum and the variable rate mechanical spring means 62 operates in unison with the variable rate air spring means 274 and 276 during the last portion of the first or upward stroke and the first portion of the second or downward stroke of the diaphragm and piston assemblies 56 and 52 to aid in returning the diaphragm and piston assemblies through their second stroke. During this mode of operation, the piston assembly 52 of the pump means 50 is going through its maximum or near-maximum displacement or stroke and pumping action takes place alternately from both chambers 110 and 112 at approximately an equal rate.

During high speed operation of the engine 12, such as at 4000-4200 rpm at maximum load or wide open throttle, the diaphragm assembly 56 will be displaced upwardly and be in engagement with the variable rate mechanical spring means 62 throughout its cycle of operation. The displacement of the diaphragm and piston assemblies 56 and 52 during high speed and load operation is less than at medium speed and load operation and the air spring means 274, 276 and mechanical spring means 62 at all times operate in unison to exert a relatively stiff or high biasing force against upward movement of the diaphragm assembly 56. During this mode of operation, the diaphragm and piston assemblies 56 and 52 are reciprocated back and forth adjacent the upper end of their respective housings 124 and 66, since the exhaust gas pressures are at all times above atmospheric pressure, as indicated in FIG. 2D. The major portion of the pumping effort during high engine speed operation takes place through chamber 110 and not through chamber 112. At the same time it will be noted that the unison operation of the air spring means 274, 276 and the mechanical spring means 62 insures that the diaphragm assembly 56 and the piston assembly 52 are moved through their second or return strokes even though the pressure of the exhaust pressure pulsations is at all times above atmospheric pressure.

Figure 4:
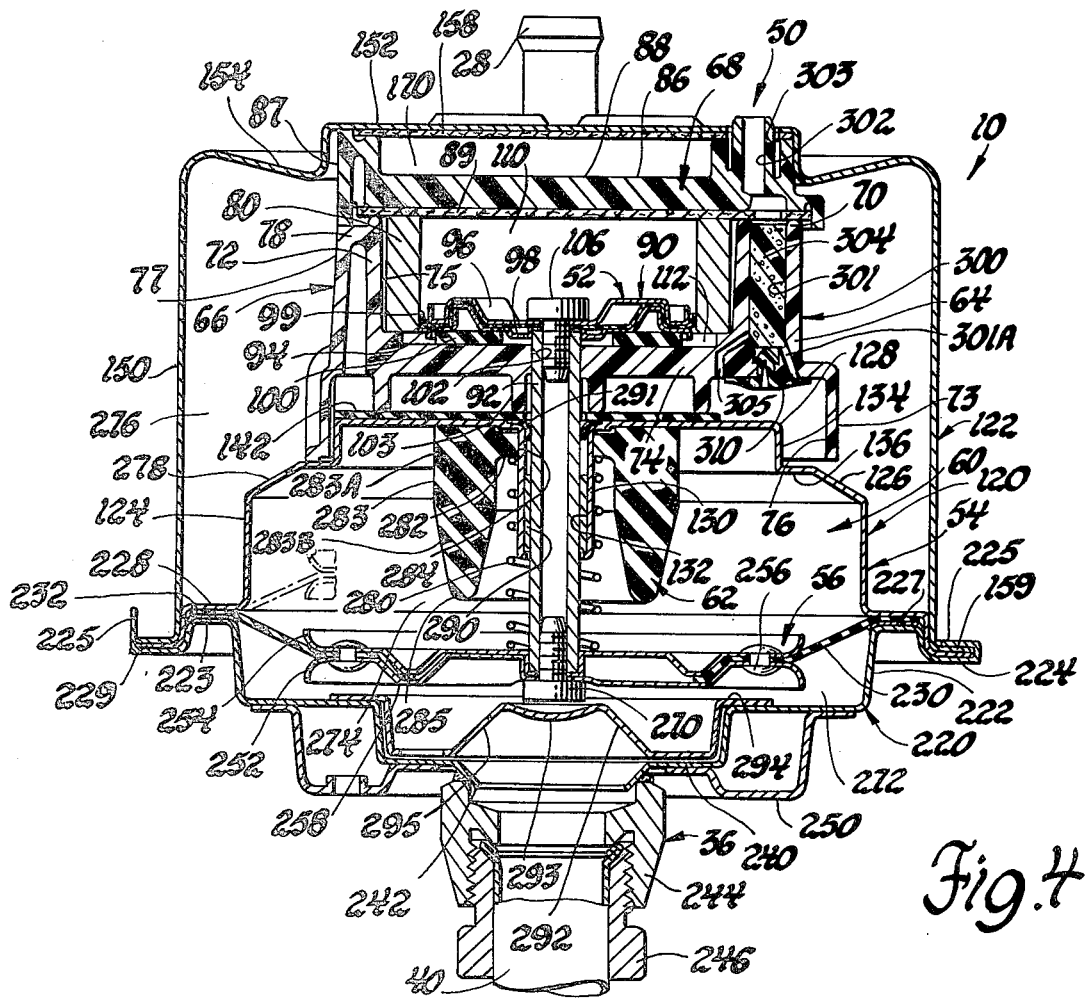
FIG. 4 is a cross-sectional view of the pump assembly shown in FIG. 3, with portions shown in elevation, taken approximately along line 4—4 of FIG. 3.

Another feature of the novel pump assembly 10 heretofore described is that it includes a compensation means 300 to compensate for operation of the pump assembly 10 at different outside ambient pressures and temperatures and to insure that the pressure in the air spring means 60 never is at a pressure less than the ambient atmospheric pressure. To this end, and as best shown in FIG. 4, the pump housing 66 includes axially extending apertures 301 and 301A through its annular side wall 78. The apertures 301A are in communication with the chamber 276 of the air spring means and in communication with the aperture 301. The aperture 301 is in communication with an aperture 302 in a nipple or tube 303 formed integral with end cover housing 86. The tube 303 extends through an aperture in the end wall portion 152 of the housing 122. Disposed within the aperture 301 is a filter 304 and the pump housing 66 carries a suitable one-way flexible umbrella check valve 310 which is normally self-biased toward a closed position, as shown in FIG. 4, in which it overlies the apertures 301A. In addition, the pump housing member 70 has a very small diameter bypass bleed hole 305 which at all times communicates chamber 276 with the aperture 301. When the ambient pressure exceeds the pressure in the chamber 276, the check valve 310 will open to allow air to be drawn in from the atmosphere. This feature insures that the diaphragm assembly 56 will not be prevented from being moved through its second stroke due to a negative pressure in the chamber 276 and, along with the bleed hole 305, insures that the pump assembly will operate the same under all environmental temperature and ambient pressure conditions.

It should be noted that while the actuating means 54 has been described as containing a diaphragm assembly 56, a reciprocable member in the form of a piston or piston assembly like the piston assembly 52 of the pump means 50 could be used in its place, if desired. In such an event, the housings 124 and 222 would be modified to contain a cylindrical liner like the liner 80 used with the pump means 50 to slidably receive the piston means.

It has been found with the aid of a mathematical model and some actual testing that a pump assembly constructed as described above and having the following approximate dimensions is suitable for use with a typical four-cylinder engine passenger car.

APPROXIMATE PUMP DIMENSIONS

Diaphragm assembly 56 diameter=0.101 meters.

Piston assembly 52 diameter=0.0453 meters.

Spring constant for spring means 62=105070 Newtons/meter.

Spring preload for spring means 62=0.0

Flow area for check valves 200, 202, 204 and 206=0.0001556 meters$^2$.

Chamber 272 volume (initial)=0.000148 meters$^3$.

Chamber 112 volume (initial)=0.000006528 meters$^3$.

Chamber 110 volume (initial)=0.0000172 meters$^3$.

Air spring 274, 276 volume (initial)=0.0005809 meters$^3$.

Aperture 301 flow area=0.000000785 meters$^2$.

It has been found that the novel pump assembly 10 is operable to adequately supply vacuum to the brake booster 20 to satisfactorily operate a power brake system at all engine speeds above approximately 1200 rpm. At lesser engine speeds, such as idle speed (650 rpm), assist from the intake manifold will normally be required for fully satisfactory operation, although proper sizing of the pump means may allow for good operation at idle speed also.

FIG. 11 shows another embodiment of a novel pump assembly 315 of the present invention. The pump assembly 315 is shown in schematic form in FIG. 11 and is identical in structure and operation to the pump assembly 10 shown in FIGS. 5 and 10, except as noted below. The parts of the pump assembly 315 which are identical or substantially identical with the parts of the pump assembly 10 are given the same reference numerals.

The pump assembly 315 shown in FIG. 11 differs from that shown in FIGS. 5 and 10 in that a second air spring means 317 is provided in place of the mechanical spring means 62 shown in FIGS. 5 and 10.

As shown in FIG. 11, an actuating means 54 is provided which includes a pair of housings 320 and 322. The housing 320 could be like the housing 124 shown in FIG. 5, except that the housing 320 would be cylindrical in shape and a second diaphragm assembly 324 would comprise its end wall. The housing 320 at its lower end clamps the first diaphragm assembly 56 to a bonnet assembly 220. The underside of the diaphragm assembly 56 with the bonnet assembly 220 would define the chamber 272. The second diaphragm assembly 324 is clamped between the upper end of the housing 320 and the lower end of the second housing 322. In this embodiment, the housing 322 at its upper planar end 325 would carry and support one end of a bearing and seal assembly 326 for slidably receiving and supporting the piston rod 92 for reciprocable movement and the diaphragm assembly 324 adjacent its inner periphery would be suitably, sealably secured to the bearing and seal assembly 326.

In this embodiment, the diaphragm assembly 56 and the diaphragm assembly 324 along with the housing 320 define a first air spring means or chamber 328 and the diaphragm assembly 324, housing 322 and bearing and seal assembly 326 would define the second air spring means or chamber 317. The housing 320 is provided with a suitable bleed hole 327 and check valve means 327A to compensate for ambient temperature and pressure variations, and in the same manner as previously described in connection with the bleed hole 305 and check valve 310 of the pump assembly 10. The first air spring means 328 would be a variable rate air spring having a given spring rate and the second air spring means 317 would be a variable rate spring having a higher or stiffer spring rate.

The second diaphragm assembly 324 includes a flexible diaphragm 329 made from a suitable elastomeric or fabric impregnated elastomeric material and which can be readily flexed adjacent both its inner and outer peripheries. The diaphragm assembly 324 intermediate its inner and outer peripheries carries an annular rigid member 330 having a plurality of apertures 331 extending therethrough to normally communicate the first air spring means 328 with the second air spring means 317. The latter communication is controlled by a stationary annular closure member or plate 332 secured to the piston rod 92. The closure member 332 is normally spaced from the apertures 331 in the diaphragm assembly 324, but engages the annular member 330 to close off the apertures 331 to block communication between the air spring 328 and 317 during high speed and load operation of the engine.

The basic operation of the pump assembly 315 is the same as that previously described in connection with the pump assembly 10 shown in FIGS. 5 and 10. That is, during low to moderate engine speed and/or load operations, the diaphragm assembly 56 is flexed by the exhaust gas pressure pulsations to reciprocate the piston assembly 52 and with the air springs 328 and 317 offering only a slight resistance to movement of the diaphragm assembly 56 through its first or upward stroke during the pressure increasing phase of each pressure pulse cycle, but with the pressure increase in the air springs 328 and 317 during this upward movement being sufficient to return or move the diaphragm assembly 56 through its second stroke during the pressure decreasing phase of each pressure pulse cycle. During this operation, the pump means 50 operates in the same manner as previously described in connection with the pump assembly 10.

During medium speed and/or load operation of the engine 12, the exhaust gas pressure pulsations cause the diaphragm and piston assemblies 56 and 52 to be reciprocated at or near their maximum strokes and with the diaphragm assembly 56 first carsing the air in air spring 328 to be compressed during the initial portion of its first stroke and with the plate 332 engaging the second diaphragm assembly 324 to block fluid communication between the air springs 328 and 317 and causing deflection of the diaphragm assembly 324 upwardly, as viewed in FIG. 11, to compress the air in air spring 317 during the latter portion of its first stroke. The second air spring 317, due to its lesser volume, provides a stiffer resistance to movement than does the first air spring 317. During movement of the diaphragm assembly 56 through its second or downward stroke the reverse movement takes place. Thus, the air springs 328 and 317 during the latter portion of the first stroke and the first portion of the second stroke operate in unison. During this operation, the pump means 50 operates in the same manner as previously described in connection with the pump assembly 10.

During high speed and/or load operation of the engine 12, the pressure of the exhaust gas pressure pulsations is such that the plate 332 is at all times in engagement with the diaphragm assembly 324 and the second air spring 317 at all times operates in unison with the first air spring 328 to effect rapid reciprocable movement of the piston assembly 52 and diaphragm assemblies adjacent the upper end of their respective housings, as viewed in FIG. 11.

From the foregoing, it should be apparent that two air springs having different variable spring rates can be used in place of a single variable rate air spring and a second variable rate mechanical spring to achieve the same operational results for a pump assembly.

With the aid of a mathematical model, it has been determined that a pump assembly like that shown in FIG. 11 having the approximate dimensions noted below would be appropriate for use with a four-cylinder internal combustion engine.

Diameter of diaphragm assembly 56=0.101 meters.
Diameter of piston assembly 52=0.0453 meters.
Outer diameter of diaphragm assembly 324=0.0906 meters.
Inner diameter of diaphragm 324=0.0309 meters.
Spacing between diaphragm assembly 324 and closure member 332 (initial)=0.008 meters.
Flow area of check valves 200, 202, 204 and 206=0.0001554 meters$^2$.
Volume of chamber 272 (initial)=0.000148 meters$^3$.
Volume of chamber 112 (initial)=0.0000062528 meters$^3$.
Volume of chamber 110 (initial)=0.0000172 meters$^3$.
Volume of air spring 328 (initial)=0.0005809 meters$^3$.
Volume of air spring 317 (initial)=0.000057 meters$^3$.
Flow area of apertures 331=0.000000785 meters$^2$.
Flow area of bleed hole 327=0.000000785 meters$^2$.

FIG. 12 is a schematic view of yet another alternate embodiment of a novel pump assembly 350 of the present invention. This embodiment is similar to the embodiment shown in FIG. 5 except that a pair of mechanical variable rate springs 352 and 354, here shown as variable rate coil springs, are employed and parts corresponding to the parts shown for pump assembly 10 will be given the same reference numerals. The spring 352 has one end secured to and in abutting engagement with the end wall 128 of the housing 120 and its other end in abutting engagement with the diaphragm assembly 56. The spring 354 is of a smaller diameter than spring 352 and has one end secured to and in abutting engagement with the end wall 128 of the housing 120. The spring 354 is located within the center space of spring 352 and has a higher or stiffer variable spring rate than spring 352. Chamber 274, in this embodiment, is at all times vented to the atmosphere via a large opening 355.

The operation of the pump assembly 350 is identical to that previously described with respect to pump assembly 10 except that during the low to medium speed and/or load ranges of the engine 12 only the variable rate mechanical spring means 352 would be operative to return the diaphragm assembly 56 through its second stroke and that during medium to high speed and/or load operations the second variable rate mechanical spring 354 would operate in unison with the first spring means 352 to provide a much stiffer variable spring rate to cause movement of the diaphragm assembly 56 through its second stroke. By using two mechanical springs 352 and 354, the need for any air spring means is eliminated.

As noted hereinbefore, the pressure or force of the pressure pulsations and the frequency thereof are lower at low engine speeds than at high engine speeds. This results in the pump assemblies having less pumping capacity at the lower engine speeds. However, the pumping capacity at these speeds can be enhanced to insure sufficient capacity to operate the pneumatic controls on the automobile. Accordingly, an important feature of the pump assemblies of the present invention is in the recognition and discovery that the capacity or operation of the pump assemblies at low engine speeds (range from approximately 800–1200 rpm) can be enhanced or substantially maximized by designing the pump assemblies so that they are operationally tuned to the frequencies of the exhaust gas pulsations during the low range of engine speeds. The manner in which this is accomplished will be described with reference to the preferred embodiment of the pump assembly 10 shown in FIGS. 3–10.

The pump assembly 10 is constructed and designed so that the primary or first spring means 60 has a predetermined average spring rate over the low speed range and the piston assembly 52, diaphragm assembly 56 and rod or shaft 92 have a combined mass such that the exhaust gas pressure pulsations during low engine speeds cause the assemblies 52 and 56 to oscillate at a frequency near their natural frequency. This maximizes the length of the stroke of the assembies 52 and 56 and thus, enhances or maximizes the capacity of the pump means 50 to pump fluid for the amount of force exerted by the exhaust gas pressures. It has been found that by tuning the natural frequency of the oscillating assemblies 52 and 56 to approximately the frequency of the exhaust gas pressure pulsations during low engine speeds that the length of the stroke or amplitude of the piston assembly 52 can be increased to substantially the length of stroke it has at higher engine speeds.

The natural or resonant frequency of a damped, oscillating body is governed by the formula:

$$f_n = \sqrt{\frac{K}{M}}$$

where $f_n$ (usually referred to as $w_n$) is the natural frequency, K is the spring rate of the primary air spring means 60 and M is the combined mass of the piston assembly 52, diaphragm assembly 56 and the rod 92. When the assemblies 52 and 56 are oscillated at their natural frequency, the amplitude or length of stroke of the oscillations is at a maximum. This can be graphically depicted, as shown in FIG. 13. The vertical side of the graph shows the amplitude of the deflection or oscillation and the horizontal side shows the frequency. The dotted line depicts the natural frequency of the oscillating body, which is the combined mass of the piston assembly 52, diaphragm assembly 56 and the rod 92. If the oscillating body is undamped, the amplitude of its deflection when oscillated at its natural frequency approaches infinity as indicated by the reference numeral 400. However, since the pump assembly 10 is damped, the curve will be like that depicted by reference numeral 410.

The pump assembly 10 is subject to both viscous and frictional damping. The viscous damping principally results from the restriction to exit flow from the pump means 50 caused by the orifices of the check valves 202, 206. This can be minimized somewhat by maximizing the area of the orifices of the check valves. Frictional damping results from the frictional forces encountered by the assemblies 52, 56 and rod 92 when reciprocated relative to their respective housings.

Thus, with the above-noted damping forces, the maximum length of stroke or amplitude of the piston assembly 52 achievable is that which occurs when the oscillating assemblies 52 and 56 are deflected at their natural frequency, as shown by the peak of the curve 410. By designing and constructing the air spring means 60 to have a given spring rate and by constructing the piston assembly 52, diaphragm assembly 56 and the rod 92 to have a given mass, the natural frequency of the oscillating assemblies or parts car be made to approach the frequency of the exhaust gas pulsations encountered during the low range of engine speeds, as shown, for example, by the phantom line band 420 in FIG. 13. When this is achieved, the stroke or amplitude of the piston assembly 52 will be near its maximum and thus enhance or maximize the capacity of the pump means 50 during low speed operation of the engine.

It has also been recognized and found that the natural frequency of the oscillating parts or assemblies 52, 56 and rod 92 increases at higher engine speeds (above 1800 rpm). This is because the spring rate of the primary air spring means 60 increases and because of the higher spring rate of the spring means 62, which is engaged and deflected by the diaphragm assembly 56 at high speeds. Also, when the spring means 62 is engaged, a part of its mass becomes a part of the combined mass of the oscillating parts. Thus, although the frequency of the exhaust gas pulsations at high engine speeds is substantially increased over that at low engine speeds, the effect of this higher frequency on the amplitude of the strokes of the piston assembly 52 is minimized to a significant extent because the natural frequency of the pump assembly at higher engine speeds also is increased. The natural frequency of the oscillating combined mass at high engine speeds is graphically depicted by the band between the lines 430 on FIG. 13. It should be noted, however, that good or adequate pump capacity would be effected at high engine speeds even if the natural frequency of the pump assembly 10 were not near the natural frequency, because of the frequency at which the pump assembly is operated. However, by also increasing the natural frequency of the pump assembly 10 at higher engine speeds, the pump capacity at these speeds is enhanced.

It should be apparent that the enhancement of pumping capacity described with reference to the pump assembly 10 can also be achieved with the pump assemblies 315 and 350 shown in FIGS. 11 and 12, respectively.

From the foregoing, it should be apparent that a novel pump assembly has been provided which can be driven by the exhaust gases of an internal combustion engine throughout a wide range of engine operating conditions. It should be further apparent that due to the inclusion of the two different variable rate spring means that the pump assembly will operate when the pressure pulsations of the exhaust gases include subatmospheric portions during their cycles and when the pressure pulsations are at all times during their cycles at a pressure above atmospheric pressure.

While the novel pump assemblies of the present invention have been described as being used as a vacuum pump assembly for use with internal combustion engines, it should be apparent to those skilled in the art that the novel pump assembly could be used to pump fluid under positive pressure, such as compressed air, etc., for use in an air shock or air springs, tires, in leveling controls and/or for use in pumping liquid washer fluid onto a windshield or headlamps of an automobile.

Although the illustrated embodiments hereof have been described in great detail, it should be apparent that certain modifications, changes and adaptations may be made in the illustrated embodiments, and that it is intended to cover all such modifications, changes and adaptations which come within the spirit of the present invention.

The subject matter of the present application is related to that of three co-pending applications filed concurrently herewith in the names of Donald Pozniak, Gerald Robertson and Michael McClain; Gerald Robertson and Donald Pozniak; and Michael McClain, and assigned to the same assignee as the present application and identified by Ser. Nos. 427,651, 421,652 and 427,666, respectively.

The embodiments of the invention in which an exclusive property or privilege is claimed are defined as follows:

1. In combination, a pump assembly and an internal combustion engine which generates exhaust gases having pressure pulsations of varying pressure, frequency and amplitude at different engine speeds, said pump assembly comprising:

a pump means for pumping a fluid and including a reciprocable pumping member movable through first and second strokes, an actuating means including a reciprocable actuating member movable through first and second strokes and which is connected to said pumping member to move the same through its first and second strokes, one side of said actuating member being in communication with said exhaust gases and with the pressure pulsations of the exhaust gases during their pressure increasing phase of each pulsation cycle causing the actuating member and pumping member to be moved through their first strokes, and during their pressure decreasing phase of each pulsation cycle allowing said actuating and pumping members to be moved through their second strokes, a first spring means engageable with one of said actuating or pumping members for effecting movement of the actuating and pumping members through their second stroke during all operating speeds of the engine, and second spring means having a higher spring rate than said first spring means and which is operable in unison with said first spring means to effect movement of said actuating and pumping members through their second strokes during engine speeds above a predetermined speed.

2. In combination, a pump assembly and an internal combustion engine which generates exhaust gases having pressure pulsations of varying pressure, frequency and amplitude at different engine speeds, said pump assembly comprising:

a pump means for pumping a fluid and including a reciprocable pumping member movable through first and second strokes, an actuating means including a reciprocable actuating member movable through first and second strokes and which is connected to said pumping member to move the same through its first and second strokes, one side of said actuating member being in communication with said exhaust gases and with the pressure pulsations of the exhaust gases during their pressure increasing phase of each pulsation cycle causing the actuating member and pumping member to be moved through their first strokes, and during their pressure decreasing phase of each pulsation cycle allowing said actuating and pumping members to be moved through their second strokes, a first non-linear, variable rate spring means engageable with one of said actuating or pumping members for effecting movement of the actuating and pumping members through their second stroke during all operating speeds of the engine, and second non-linear, variable rate spring means having a higher spring rate than said first spring means and which is operable in unison with said first spring means to efect movement of said actuating and pumping members through their second strokes during engine speeds above a predetermined speed.

3. In combination, a vacuum pump assembly and an internal combustion engine which generates exhaust gases having pressure pulsations of varying pressure, frequency and amplitude at different engine speeds, said pump assembly comprising:

a pump means for pumping air from a vacuum source and including a reciprocable pumping member movable through first and second strokes, an actuating means including a reciprocable actuating member movable through first and second strokes and which is connected to said pumping member to move the same through its first and second strokes, one side of said actuating member being in communication with said exhaust gases and with the pressure pulsations of the exhaust gases during their pressure increasing phase of each pulsation cycle causing the actuating member and pumping member to be moved through their first strokes, and during their pressure decreasing phase of each pulsation cycle allowing said actuating and pumping members to be moved through their second strokes, a first, non-linear variable rate spring means engageable with said actuating member for effecting movement of the actuating and pumping members through their second stroke during all operating speeds of the engine, and second, non-linear variable rate spring means having a higher spring rate than said first spring means and which is operable in unison with said first spring means to return the actuating and pumping members through their second strokes during engine speeds above a predetermined speed.

4. In combination, a vacuum pump assembly and an internal combustion engine having an intake manifold and which generates exhaust gases having pressure pulsations of varying pressure, frequency and amplitude at different engine speeds, said pump assembly comprising:

a double-acting pump means including a reciprocable pumping member movable through first and second strokes for pumping air from a vacuum source to the intake manifold during each stroke, an actuating means including a reciprocable actuating member movable through first and second strokes and which is connected to said pumping member to move the same through its first and second strokes, one side of said actuating member being in communication with said exhaust gases and with the pressure pulsations of the exhaust gases during their pressure increasing phase of each pulsation cycle causing the actuating member and pumping member to be moved through their first strokes, and during their pressure decreasing phase of each pulsation cycle allowing said actuating and pumping members to be moved through their second strokes, a non-linear variable rate air spring means engageable with said actuating member for effecting movement of the actuating and pumping members through their second stroke during all operating speeds of the engine, and a non-linear variable rate mechanical spring means having a higher spring rate than said air spring means and which is operable in unison with said air spring means to return the actuating and pumping members through their second strokes during engine speeds above a predetermined speed.

5. In combination, a vacuum pump assembly and an internal combustion engine having an intake manifold and which generates exhaust gases having pressure pulsations of varying pressure, frequency and amplitude at different engine speeds, said pump assembly comprising:

a double-acting pump means including a reciprocable pumping member movable through first and second strokes for pumping air from a vacuum source to the intake manifold during each stroke, an actuating means including a reciprocable actuating member movable through first and second strokes and which is connected to said pumping member by rod means to move the same through its first and second strokes, one side of said actuating member being in communication with said exhaust gases and with the pressure pulsations of the exhaust gases during their pressure increasing phase of each pulsation cycle causing the actuating member and pumping member to be moved through their first strokes, and during their pressure decreasing phase of each pulsation cycle allowing said actuating and pumping members to be moved through their second strokes, a first non-linear variable rate mechanical spring means engageable with said actuating member for effecting movement of the actuating and pumping members through their second stroke during all operating speeds of the engine, and second, non-linear variable rate mechanical spring means having a higher spring rate than said first spring means and which is operable in unison with said first spring means to return the actuating and pumping members through their second strokes during engine speeds above a predetermined speed.

6. In combination, a vacuum pump assembly and an internal combustion engine having an intake manifold and which generates exhaust gases having pressure pulsations of varying pressure, frequency and amplitude at different engine speeds, said pump assembly comprising:

a double-acting pump means including a reciprocable pumping member movable through first and second strokes for pumping air from a vacuum source to the intake manifold during each stroke, an actuating means including a reciprocable actuating member movable through first and second strokes and which is connected to said pumping member by a rod means to move the same through its first and second strokes, one side of said actuating member being in communication with said exhaust gases and with the pressure pulsations of the exhaust gases during their pressure increasing phase of each pulsation cycle causing the actuating member and pumping member to be moved through their first strokes, and during their pressure decreasing phase of each pulsation cycle allowing said actuating and pumping members to be moved through their second strokes, first and second, non-linear, variable rate air spring means, said second air spring means having a smaller air volume than the air volume of said first air spring means to provide a higher variable spring rate, the air volumes of said first and second air springs being separated by a deflectable diaphragm means, said diaphragm means having aperture means therethrough to communicate the air volumes of said first and second air spring means, a plate member carried by said rod means, said plate member being spaced from said apertures in said diaphragm means when the pump assembly is at rest, but engageable with said diaphragm means to block communication between said air volumes of said first and second air springs when said actuating member is displaced a predetermined distance, said first air spring means being in communication with said actuating member and being operable to effect movement of said actuating and pumping members through their second stroke during all operating speeds of the engine, said plate member engaging said diaphragm means during a portion of the first and second strokes of said actuating member during operation of the engine at medium speeds whereby said second air spring means operates in unison with said first air spring means during a portion of the strokes of said actuating member, said plate member at all times engaging said diaphragm means during operation of the engine at high speeds whereby said second air spring means operates in unison with said first air spring means during the entire strokes of said actuating member.

7. In combination, a vacuum pump assembly and an internal combustion engine having an intake manifold and which generates exhaust gases having pressure pulsations of varying pressure and amplitude during low, medium and high ranges of engine speed, said pump assembly comprising:

a double-acting pump means including a reciprocable pumping member movable through first and second strokes for pumping air from a source to the intake manifold to create a negative pressure at the source during each stroke of the pumping member, said pump means having a housing means with first and second ends and with said pumping member being movable relative to said housing means and dividing said housing means into first and second chambers, check valve means carried by said pump housing means for alternately communicating said first and second chambers with said source and said intake manifold during said first and second strokes of said pumping member whereby said pump means pumps air from said source to the intake manifold during each stroke of the pumping member, an actuating means including a housing means having first and second ends and a reciprocable actuating member movable relative to said housing means through first and second strokes and which is connected to said pumping member to move the latter through its first and second strokes, one side of said actuating member being in communication with said exhaust gases and said pressure pulsations during their increasing pressure phase of each amplitude causing the actuating member and pumping member to be moved through their first stroke and during their decreasing pressure phase of each amplitude allowing the actuating and pumping members to be moved through their second stroke, a first variable rate spring means engageable with said actuating member for effecting movement of the actuating and pumping members through their second strokes during low range of engine speeds, and second variable rate spring means having a higher spring rate than said first spring means and operable in unison with said first spring means to effect movement of the actuating and pumping members through their second strokes during medium and high range of engine speeds, said actuating and pumping members being movable through displacement strokes located adjacent said first ends of their respective housing means during low speed range of operation of the engine whereby a major portion of the pumping action by the pumping member takes place through said first chamber adjacent said first end of said pump housing means, said actuating and pumping members being movable through near maximum displacement strokes within their respective housing means and with the actuating member engaging the second spring means during a portion of the displacement of each stroke during medium speed range of operation of the engine whereby the pumping action by the pumping member takes place approximately equally through each of said first and second chambers thereof, said actuating and pumping members being movable through displacement strokes adjacent the second ends of their respective housing means and with the actuating member at all times being in engagement with said second spring means during high speed range of operation of said engine whereby a major portion of the pumping action by the pumping member takes place through said second chamber adjacent said second end of said pump housing means.

8. In combination, a vacuum pump assembly and an internal combustion engine having an intake manifold and which generates exhaust gases having pressure pulsations of varying pressure and amplitude during low, medium and high ranges of engine speed, said pump assembly comprising:
- a double-acting pump means including a reciprocable pumping member movable through first and second strokes for pumping air from a source to the intake manifold to create a negative pressure at the source during each stroke of the pumping member,
- said pump means having a housing means with first and second ends and with said pumping member being movable relative to said housing means and dividing said housing means into first and second chambers,
- check valve means carried by said pump housing means for alternately communicating said first and second chambers with said source and said intake manifold during said first and second strokes of said pumping member whereby said pump means pumps air from said source to the intake manifold during each stroke of the pumping member,
- an actuating means including a housing means having first and second ends and a reciprocable actuating member movable relative to said housing means through first and second strokes and which is connected to said pumping member to move the latter through its first and second strokes,
- one side of said actuating member being in communication with said exhaust gases and said pressure pulsations during their increasing pressure phase of each amplitude causing the actuating member and pumping member to be moved through their first stroke and during their decreasing pressure phase of each amplitude allowing the actuating and pumping members to be moved through their second stroke,
- a first variable rate air spring means engageable with said actuating member for effecting movement of the actuating and pumping members through their second strokes during low range of engine speeds,
- and second, non-linear, variable rate mechanical spring means having a higher spring rate than said first spring means and operable in unison with said first spring means to effect movement of the actuating and pumping members through their second strokes during medium and high range of engine speeds, said actuating and pumping members being movable through displacement strokes located adjacent said first ends of their respective housing means during low speed range of operation of the engine whereby a major portion of the pumping action by the pumping member takes place through said first chamber adjacent said first end of said pump housing means, said actuating and pumping members being movable through near maximum displacement strokes within their respective housing means and with the actuating member engaging the second mechanical spring means during a portion of the displacement of each stroke during medium speed range of operation of the engine whereby the pumping action by the pumping member takes place approximately equally through each of said first and second chambers thereof, said actuating and pumping members being movable through displacement strokes adjacent the second ends of their respective housing means and with the actuating member at all times being in engagement with said second mechanical spring means during high speed range of operation of said engine whereby a major portion of the pumping action by the pumping member takes place through said second chamber adjacent said second end of said pump housing means.

9. In combination, a pump assembly and an internal combustion engine which generates exhaust gases having pressure pulsations of varying pressure, frequency and amplitude at different engine speeds, said pump assembly comprising:
- a pump means for pumping a fluid and including a reciprocable pumping assembly movable through first and second strokes,
- an actuating means including a reciprocable actuating assembly movable through first and second strokes and which includes a rod connected to said reciprocable pumping assembly to move the same through its first and second strokes,
- one side of said actuating assembly being in communication with said exhaust gases and with the pressure pulsations of the exhaust gases during their pressure increasing phase of each pulsation cycle causing the reciprocable actuating and pumping assemblies to be moved through their first strokes, and during their pressure decreasing phase of each pulsation cycle allowing said reciprocable actuating and pumping assemblies to be moved through their second strokes,
- non-linear, variable rate spring means engageable with one of said reciprocable actuating or pumping assemblies for effecting movement of the reciprocable actuating and pumping assemblies through their second stroke during all operating speeds of the engine,
- said spring means having an average spring constant over a range of low engine speeds and said reciprocable pumping and actuating assemblies having a combined mass such that the reciprocable pumping and actuating assemblies are reciprocated by the exhaust gas pulsations during said range of low engine speeds at frequencies approaching their natural frequency whereby the amplitude of their strokes approaches the amplitude of the strokes they would have at their natural frequency so that the pump assembly functions to pump said fluid at substantially its maximum capacity for said exhaust gas pulsation frequencies generated during said range of low engine speeds.

10. In combination, a pump assembly and an internal combustion engine which generates exhaust gases having pressure pulsations of varying pressure, frequency and amplitude at different engine speeds, said pump assembly comprising:

a pump means for pumping a fluid and including a reciprocable pumping assembly movable through first and second strokes, an actuating means including a reciprocable actuating asembly movable through first and second strokes and which includes a rod connected to said pumping assembly to move the same through its first and second strokes, one side of said actuating assembly being in communication with said exhaust gases and with the pressure pulsations of the exhaust gases during their pressure increasing phase of each pulsation cycle causing the actuating and pumping assemblies to be moved through their first strokes, and during their pressure decreasing phase of each pulsation cycle allowing said actuating and pumping assemblies to be moved through their second strokes, a first non-linear, variable rate spring means engageable with one of said actuating or pumping assemblies for effecting movement of the actuating and pumping assemblies through their second stroke during all operating speeds of the engine, and second non-linear, variable rate spring means having a higher spring rate than said first spring means and which is operable in unison with said first spring means to effect movement of said actuating and pumping assemblies through their second strokes during engine speeds above a predetermined speed, said first spring means having an average spring constant over a range of low engine speeds and said pumping and actuating assemblies having a combined mass such that the pumping and actuating assemblies are reciprocated by the exhaust gas pulsations during said range of low engine speeds at frequencies approaching their natural frequency whereby the amplitude of their strokes approaches the amplitude of the strokes they would have at their natural frequency so that the pump assembly functions to pump said fluid at substantially its maximum capacity for said exhaust gas pulsation frequencies generated during said range of low engine speeds, said combined mass of said pumping and actuating assemblies and said first and second spring means having an average spring constant over a range of high engine speeds such that the pumping and actuating assemblies are reciprocated by the exhaust gas pulsations during said range of high engine speeds at frequencies near their natural frequencies whereby the amplitude of their strokes approaches the amplitude of the strokes they would have at their natural frequency so that the pump assembly functions at substantially maximum capacity during said range of high engine speeds.

11. In combination, a vacuum pump assembly and an internal combustion engine having an intake manifold and which generates exhaust gases having pressure pulsations of varying pressure and amplitude during low, medium and high ranges of engine speed, said vacuum pump assembly comprising:

a double-acting pump means including a reciprocable pumping assembly movable through first and second strokes for pumping air from a source to the intake manifold to create a negative pressure at the source during each stroke of the pumping assembly, said pump means having a housing means with first and second ends and with said pumping assembly being movable relative to said housing means and dividing said housing means into first and second chambers, check valve means carried by said pump housing means for alternately communicating said first and second chambers with said source and said intake manifold during said first and second strokes of said pumping assembly whereby said pump means pumps air from said source to the intake manifold during each stroke of the pumping assembly, an actuating means including a housing means having first and second ends and a reciprocable actuating assembly movable relative to said housing means through first and second strokes and which includes a rod connected to said pumping assembly to move the latter through its first and second strokes, one side of said actuating assembly being in communication with said exhaust gases and said pressure pulsations during their increasing pressure phase of each amplitude causing the actuating and pumping assemblies to be moved through their first stroke and during their decreasing pressure phase of each amplitude allowing the actuating and pumping assemblies to be moved through their second stroke, a first variable rate air spring means engageable with said actuating assembly for effecting movement of the actuating and pumping assemblies through their second strokes during said low range of engine speeds, and second, non-linear, variable rate mechanical spring means having a higher spring rate than said first spring means and operable in unison with said first spring means to effect movement of the actuating and pumping assemblies through their second strokes during said medium and high range of engine speeds, said actuating and pumping assemblies being movable through displacement strokes located adjacent said first ends of their respective housing means during low speed range of operation of the engine whereby a major portion of the pumping action by the pumping assembly takes place through said first chamber adjacent said first end of said pump housing means, said actuating and pumping assemblies being movable through near maximum displacement strokes within their respective housing means and with the actuating assembly engaging the second mechanical spring means during a portion of the displacement of each stroke during medium speed range of operation of the engine whereby the pumping action by the pumping assembly takes place approximately equally through each of said first and second chambers thereof, said actuating and pumping assemblies being movable through displacement strokes adjacent the second ends of their respective housing means and with the actuating assembly at all times being in engagement with said second mechanical spring means during said high speed range of operation of said engine whereby a major portion of the pumping action by the pumping assembly takes place through said second chamber adjacent said second end of said pump housing means, said first spring means having an average spring constant over a range of low engine speeds and said pumping and actuating assemblies having a combined mass such that the pumping and actuating assemblies are reciprocated by the exhaust gas pulsations during said range of low engine speeds at frequencies approaching their natural frequency whereby the amplitude of their strokes approaches the amplitude of the strokes they would have at their natural frequency so that the pump assembly functions to pump said fluid at substantially its maximum capacity for said exhaust gas pulsation frequencies generated during said range of low engine speeds.

* * * * *

UNITED STATES PATENT AND TRADEMARK OFFICE
CERTIFICATE OF CORRECTION

PATENT NO. : 4,479,765

DATED : October 30, 1984

INVENTOR(S) : Gerald F. Robertson; Donald J. Pozniak and Michael J. McClain

It is certified that error appears in the above-identified patent and that said Letters Patent is hereby corrected as shown below:

Column 17, line 15, "carsing" should be -- causing --.

Column 19, line 45, "car" should be -- can --.

Column 20, line 51, "421,652" should be -- 427,652 --.

Column 21, line 53, "efect" should be -- effect --.

Signed and Sealed this

Fourth Day of June 1985

[SEAL]

Attest:

DONALD J. QUIGG

Attesting Officer   Acting Commissioner of Patents and Trademarks